Sept. 28, 1971    YOSHIYUKI KOISHIKAWA    3,608,417
TAMBOURINE

Filed March 26, 1970    4 Sheets-Sheet 1

YOSHIYUKI KOISHIKAWA,
INVENTOR

BY Wendroth, Lind & Ponack

ATTORNEYS

Sept. 28, 1971  YOSHIYUKI KOISHIKAWA  3,608,417
TAMBOURINE
Filed March 26, 1970  4 Sheets-Sheet 2
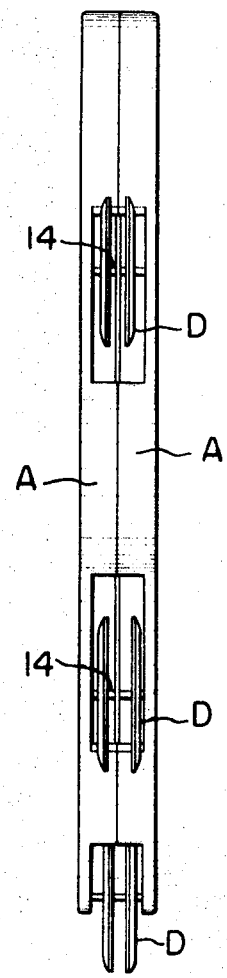
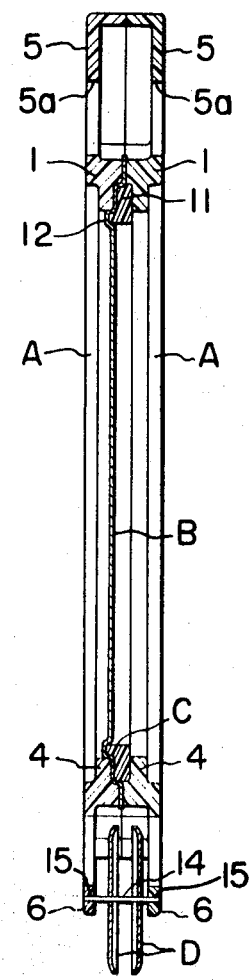
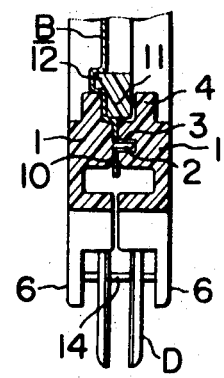
YOSHIYUKI KOISHIKAWA,
INVENTOR
BY Wenderoth, Lind & Ponack
ATTORNEYS Sept. 28, 1971  YOSHIYUKI KOISHIKAWA  3,608,417
TAMBOURINE Filed March 26, 1970  4 Sheets-Sheet 4

YOSHIYUKI KOISHIKAWA,
INVENTOR

BY Wendelroth, Lind & Ponack

ATTORNEYS

United States Patent Office 3,608,417
Patented Sept. 28, 1971

3,608,417
TAMBOURINE
Yoshiyuki Koishikawa, 2365 Kawarada-cho,
Yokkaichi Mie Prefecture, Japan
Filed Mar. 26, 1970, Ser. No. 22,844
Claims priority, application Japan, Dec. 4, 1969,
44/114,676
Int. Cl. G10d *13/02*
U.S. Cl. 84—418                    9 Claims

ABSTRACT OF THE DISCLOSURE

A tambourine made of a pair of synthetic resin front and back annular frames to be overlapped and affixed to one another so as to form a stepped or channel shape in cross-section area for clamping the skin with the help of a similar material skin-tensioning ring interposed between the internal peripheral edges of the respective frame pieces. The frame pieces are each provided with generally peripherally spaced projections and recesses respectively to be complementally engaged with those on the other opposed frame piece and are also provided with a hand grip portion. The frame also have recessed portions for fitting bells within the outer peripheral edges of said annular pieces. The skin or a sheet is provided with circumferentially spaced peripheral attaching holes to receive the aforementioned projections of the annular frame, and the skin is adapted to be tightly held between the respective annular pieces of said two frames. As a part of the tambourine assembly, the annular tightening piece has a stepped cross-section with an offset portion to tension the sheet while cooperating with the corresponding stepped portion or recessed channel between the frames, and further includes a suitable hand grip, and fastener means for tightly interconnecting the pair of frames.

---

The present invention relates to an improvement of a tambourine.

One of the main objects of the present invention is to provide an improved tambourine having a simple structure, manufacture of which is easy and being suitable for mass production.

Another of the main objects of the present invention is to provide an improved tambourine having a beautiful appearance and being easy to handle.

Still another of the main objects of the present invention is to provide an improved tambourine in which the assembly and fastening of the skin or sheet is simple and positive so that the skin or sheet will not loosen, with the result that the tambourine is always able to play a beautiful sound.

In order to achieve the aforesaid various objects, a tambourine according to the present invention comprises front and back synthetic resin frames to be overlapped and removably affixed to one another so that at the internal peripheral edges of said frames there is formed annular recess of stepped or channed-shaped cross-section. The frame pieces are of annular form provided respectively with complementally fitting projections and concavities respectively in opposed surfaces. Provided at the external peripheral edges of said frames is a grip and other recessed portions for fitting bells therein. The skin or sheet is provided with holes to be penetrated along with projections of said annular piece generally at an external peripheral edge thereof, with an annular tightening piece for tensioning the skin, which piece is of complementary stepped cross-sectional form and adapted to fit within an annular concave groove formed between the opposite annular frame pieces. Fastener means either integrally formed or otherwise serve as means for tightly interconnecting the pair of frames.

As mentioned above, at opposed areas of each of the annular frame pieces projections and concavities to be complementally engaged with each other are provided near the outer peripheral edges for gripping the peripheral edge of said sheet when inserted therebetween. Due to this construction wherein fastening pin-like projections pass through the sheet and enter complementary penetrating holes and due also to the form and mode of assembly of said two frames together with the annular skin tightening piece therebetween, the said skin and said two frames are firmly affixed in an assembled relationship so as to preclude loosening of said sheet and said two frames as well.

Further, in the present invention, said annular skin tightening piece is so assembled inside of the annular concave groove formed between the annular frame pieces in a manner whereby the external peripheral edge of the skin or sheet is tightly tensioned by said annular tightening piece cooperating with said concave groove, whereby the entire external peripheral edge of said sheet is gripped so that it is uniformly tensioned without tending to lossen, thereby assuring that the tambourine according to the present invention always plays a beautiful sound.

In addition, in the present invention, as mentioned above, due to the improved form having separate front and back frames, together with said sheet and said annular tightening piece for the sheet, assembly is so simplified and positive that this tambourine is most suitable for mass production.

Furthermore, because said frames are made of a synthetic resin, the finished tambourine according to the present invention is able to be beautiful and rich in durability.

Other objects and advantages of the present invention will become apparent from explanations of an illustrative example to be described hereinafter.

In the drawings,

FIG. 2 is a side elevation of FIG. 1;

FIGS. 3 and 4 are cross-sections taken along line III—III and line IV—IV, respectively, of FIG. 1;

Figure 1:
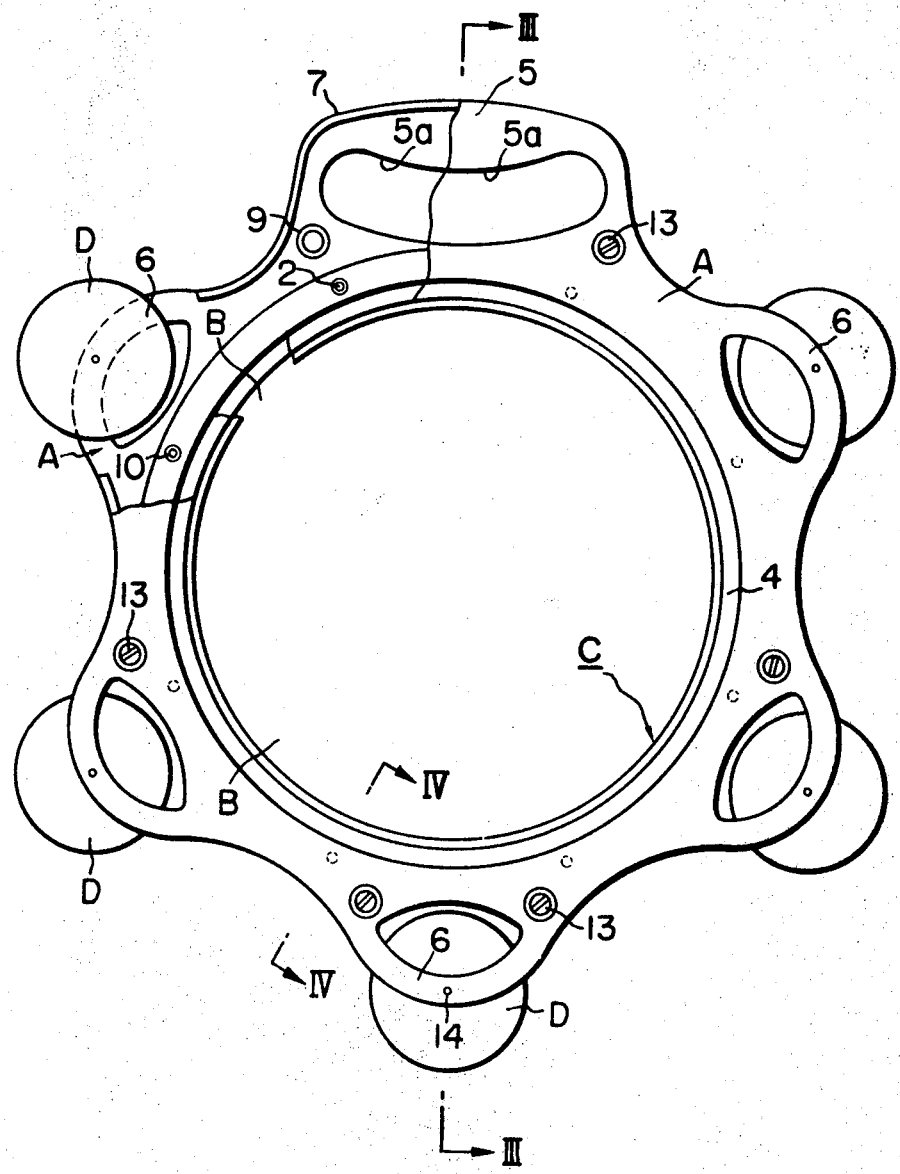
FIG. 1 is a fragmentary front elevation showing one embodiment of a tambourine according to the preesnt invention.

In FIGS. 1 and 2, A represents each of the front and back frames made of a synthetic resin, B is a skin or sheet disposed between the two frames, C is an annular tightening piece for the sheet, and D are bells mounted on the frames.

Figure 5:
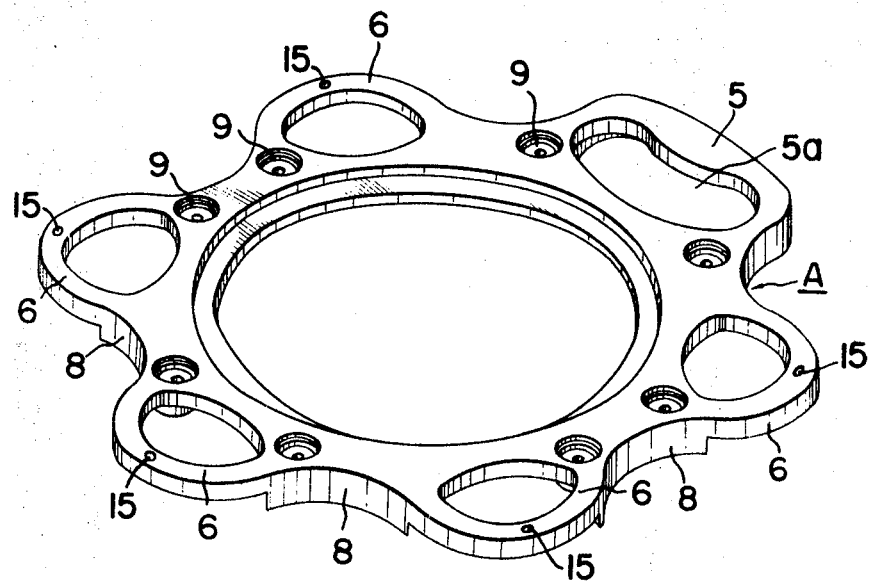
FIGS. 5 and 6 are a front side perspective view and a back side perspective view of the frame.
Figure 6:
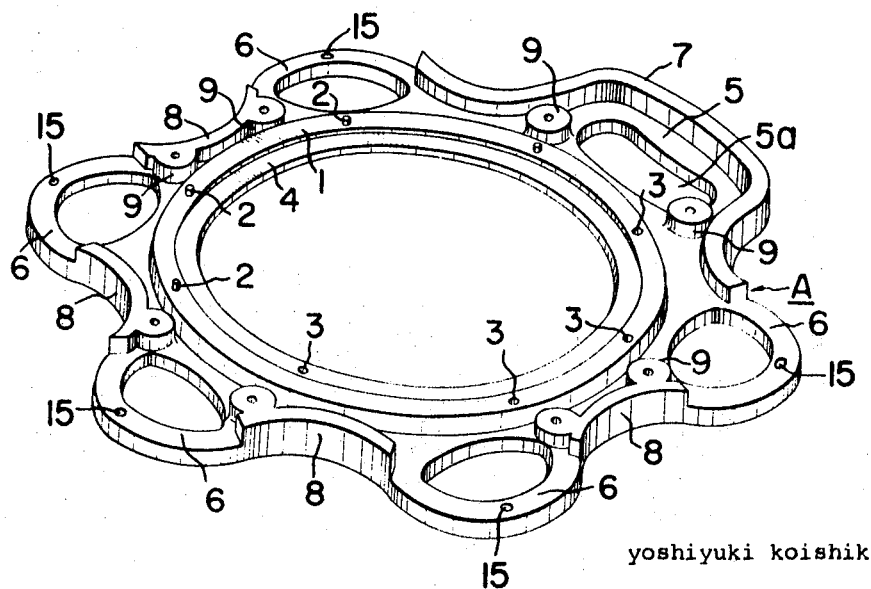

As will be apparent from FIGS. 5 and 6, on each of the front and back frames A, at preferably diametrically opposite portions of the annular pieces, a plurality of pin-like projections 2 and recesses 3 are provided on each frame piece so that when the two frames are assembled, the individual projections and recesses become engaged with each other and act to tension the sheet.

On the internal peripheral edge of the annular piece 1, an annular stair or stepped shoulder portion 4 is provided integrally therewith, and on an external peripheral edge of the annular piece 1, a grip portion 5 is provided and equipped with a window hole 5a for grasping by hand. Also, portions 6 for fitting bells D are projectingly provided integrally with the frames, said portions 6 for receiving the bells D being provided at regular intervals. From the external peripheral edge of the grip portion 5 and intermediate the adjoining portions 6 for fitting bells D, a side wall piece 7 and a plurality of side wall pieces 8 are perpendicularly provided, respectively so that the opposite surfaces may be engaged when said two frames are assembled.

Further, adjacently within said side wall piece 7 and side wall pieces 8, there is provided a plurality of generally cylindrical bosses to be penetrated with metal fittings or fasteners for tightly connecting the two frames 9.

Figure 7:
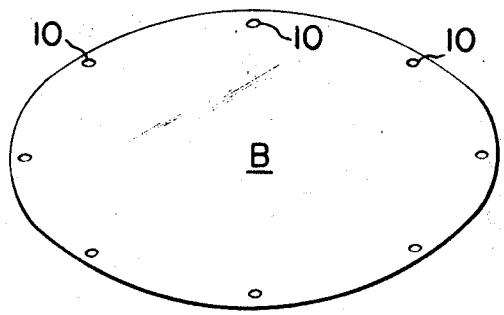
FIG. 7 is a perspective view of the skin or sheet.

The skin or sheet B is constituted by a synthetic resin film and as will be apparent from FIG. 7 is provided at the external peripheral edge thereof with pre-spaced holes 10 adapted to be penetrated by said projections 2 arranged in a corresponding circular row.

Figure 8:
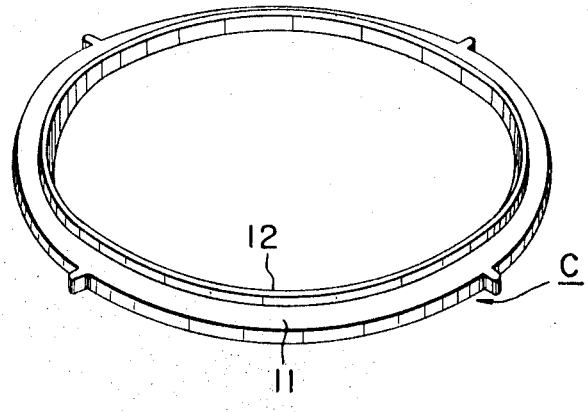
FIG. 8 is a perspective view of the annular tightening piece for tightening the sheet.

As shown in FIG. 8, in the annular tightening piece C for the sheet B, at one surface of the internal peripheral edge of the annular main piece 11 adapted to be inserted within a concave groove formed by and between the opposite annular pieces 1, having their stepped annular portions 4, an annular protruding rim 12 is integrally provided.

When a tambourine is assembled, the pin-like projections 2 provided on one half of the annular piece 1 of one frame A penetrate the holes 10 of the sheet B and project complementally into the aligned recesses 3 of the other frame A, with the annular main piece 11 for tightening the sheet being interposed with the sheet so as to thereby overlap said two frame A. Note that those projections 2 on one of the frames pass through the holes 10 of the sheet B and penetrate the recesses 3 of the other frame A, whereas the diametrically opposed projections 2 of the other frame A penetrate the remaining holes 10 of said sheet B, and likewise enter into the recesses 3 of the first of the frames A. Several tightening metal fasteners 13 are tightened into the opposite fastener receiving bosses of the two frames. Additionally opposed pairs of the bosses 9, when made of a synthetic resin, may be abuttingly fused to secure the two half frames together.

During this assembly, when the outer peripheral edge of said skin or sheet B is fixed by co-action of the projections 2 with the aligned recesses 3 between the annular pieces 1 of the opposed frames A simultaneously and within the annular concave groove formed between said two annular pieces 9 and their respective stepped portions 4, the sheet B is peripherally deformed generally in an L shape cross-section and pressingly clamped by the annular main portion 11 of the annular tightening piece C and is further bent to conform with the rim 12 and the internal peripheral surface of the stepped portion 4 of one frame A. Accordingly, the sheet B is uniformly tensioned around the entire outer peripheral edge thereof and does not become loosened in use and the improved tambourine of the present invention always plays a beautiful sound.

Also, during assembly, the side wall pieces 7 and 8 of said two frames A impinge to form a frame trunk side wall of the tambourine.

Between the opposed portions 6 of the adjoining frames, bells D are mounted via axes 14 pressed into opposed openings 15.

The so assembled tambourine is grasped by a user's hand inserted into the window holes 5a of the grip portions 5 of the adjoined frames preparatory to and during use.

While the present invention has been explained with reference to one illustrative embodiment, it is to be understood that the present invention is not to be limited to such an embodiment, and various changes of construction design may be possible without departing from the spirit of the present invention.

What is claimed is:

1. A tambourine comprising in combination aligned front and back annular frames made of synthetic resin and having facing portions for at least partial cooperative mating engagement with a tambourine skin clamped therebetween; each frame having an inner peripheral flange portion of step-shape cross-section whereby when said frames are in face-to-face assembled relation they form an annular channel-shaped recess adjacent the inner periphery thereof; a tambourine skin or sheet of generally disc shape adapted to be operatively held in tightly stretched condition by its outer peripheral area when disposed within said channel-shaped recess and between said frames; an annular skin-fastening and tightening piece interposed between said frame facing portions and disposed within said annular channel-shaped recess after the interpositioning therein of the outer peripheral edge of the tambourine skin; said frames having a plurality of generally circumferentially spaced projections and recesses which complementally coact with their corresponding counterpart on the facing frame and which are disposed in generally diametrically opposed relation on said mating face portions to grip and to help hold the generally outer peripheral portion of said tambourine skin; said frames at their outer periphery having complemental means forming a hand grip portion and means for attaching musical bell means at a plurality of circumferentially spaced places; bell means cooperatively disposed with said bell attaching means; and fastener means for tightly securing said front and back frames in assembled relationship with said skin and skin-tightening piece held therebetween.

2. A tambourine as defined in claim 1 wherein said skin-tightening piece has a step-like L-shape cross-section which includes the main body portion constituting that disposed within said channel-shaped recess, and also having a transversely extending flange portion wider than said channel-shaped recess to annularly overlie and help tension said skin during the assembly thereof.

3. A tambourine as defined in claim 1 wherein said tambourine skin is provided near its outer peripheral edge with a plurality of preformed holes corresponding in size, number and spacing to said projections and recesses of the frames, whereby the projections project through said preformed holes to help tightly hold the skin in assembled relationship.

4. A tambourine as defined in claim 3 wherein said skin-tightening piece has a step-like L-shape cross-section which includes the main body portion constituting that disposed within said channel-shaped recess, and also having a transversely extending flange portion wider than said channel-shaped recess to annularly overlie and help tension said skin during the assembly thereof.

5. A tambourine as defined in claim 1 wherein said complemental means at the outer periphery of said frames for forming the hand grip include a contoured hand grip area with a finger-receiving aperture, and having wall portions extending transversely from each frame toward and abutting with each other to form at least a partially enclosed generally hollow hand grip.

6. A tambournie as defined in claim 1 wherein said complemental means at the outer periphery of said frames for forming the means for attaching said musical bell means includes pocket-like recesses formed by radially extending wall portions held in opposed spaced relation by transversely extending wall portions directed from intermediate areas of said radially extending wall portions, toward and abutting each other from each of said front and back frames, and a pin-like axis mounting one of said bell means at least partially within each of said pocket-like recesses.

7. A tambourine as defined in claim 1 wherein said means for tightly securing said front and back frames include a plurality of circumferentially spaced screw-fastener-receiving boss means on at least one of said frames and screw fasteners cooperating with and passing through screw-receiving apertures provided in the other of said frames in opposed relationship to and for interconnection with said boss means.

8. A tambourine as defined in claim 1 wherein said means for forming said hand grip portion and for attaching said bell means include radially extending wall portions of said frames terminating in a generally undulating shaped transverse peripheral edge with said bell means disposed at generally equal-distant spaces at the outermost radial extent of the undulations and progressively apart from said hand grip portion.

9. A tambourine as defined in claim 1 wherein the means for securing the front and back frames together include thermally fused together abutting surfaces.

References Cited

UNITED STATES PATENTS

| | | | |
|---|---|---|---|
| 1,009,467 | 11/1911 | Bryant | 84—411 |
| 3,029,679 | 4/1962 | La Londe | 84—411 |

FOREIGN PATENTS

| | | | |
|---|---|---|---|
| 1,142,365 | 2/1969 | Great Britain | 84—418 |

RICHARD B. WILKINSON, Primary Examiner

J. F. GONZALES, Assistant Examiner